Feb. 27, 1968 H. E. BRANSON 3,370,892
HYDRAULIC BRAKE SYSTEM FOR TRACTOR-TRAILER COMBINATION
Filed April 14, 1966
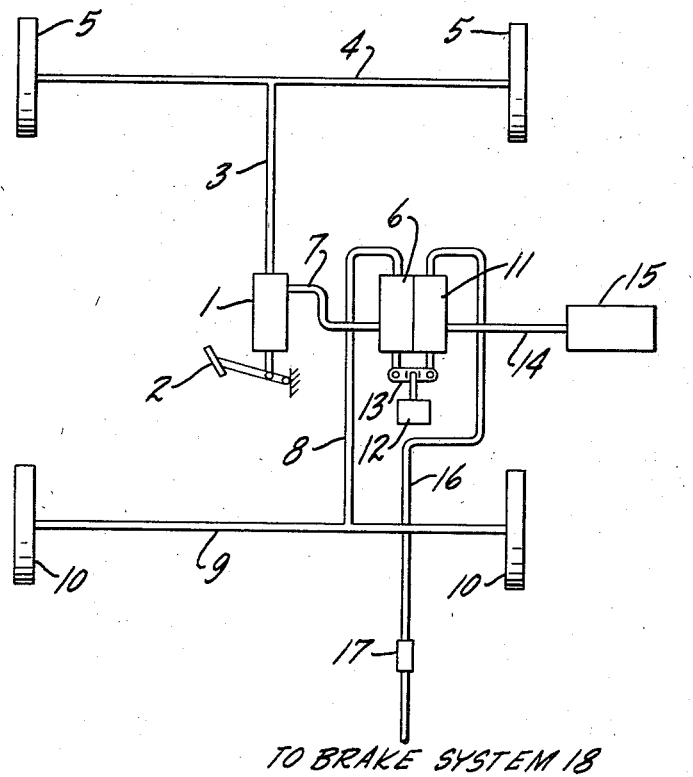
TO BRAKE SYSTEM 18
INVENTOR.
Henry E. Branson,
BY Parker & Carter
Attorneys.

United States Patent Office 3,370,892
Patented Feb. 27, 1968

3,370,892
HYDRAULIC BRAKE SYSTEM FOR TRACTOR-TRAILER COMBINATION
Henry E. Branson, Chicago, Ill., assignor to Stromberg Hydraulic Brake & Coupling Company, Chicago, Ill., a corporation of Illinois
Filed Apr. 14, 1966, Ser. No. 542,543
4 Claims. (Cl. 303—7)

ABSTRACT OF THE DISCLOSURE

This invention discloses the use in connection with a brake controlled tractor-trailer combination, a single operated control element which may apply pressure to the brakes on the tractor together with a separate operator controlled element which may apply brakes on part of the tractor braking element and also may at the will of the operator apply brakes to the trailer, the arrangement being such that when no trailer is attached to the system, the two operator controls still apply one to apply all the brakes on the trailer, the other to apply part of the brakes on the trailer without reference to the absent tractor.

---

This invention relates to improvements in hydraulic brake systems for tractor-trailer combination and provides means whereby a single tractor master cylinder may simultaneously operate on the tractor brakes in the usual manner and whereby by separate operator controlled means some of the tractor brakes and some of the trailer brakes may be operated independent of the tractor master cylinder brakes.

This invention supplements the well known type of dual brake controls whereby a single master cylinder by separate means operates at least two groups of tractor brakes so that if one group should lose hydraulic pressure, the other group would still be available. At the same time auxiliary master cylinder controls make it possible to simultaneously apply some of the tractor brakes and all of the trailer brakes even though other of the tractor brakes cannot be operated.

Other objects will appear from time to time throughout the specification and claims.

The invention is illustrated more or less diagrammatically in the accompanying drawing wherein the figure is a diagrammatic flow sheet.

Like parts are indicated by like numerals throughout the specification and drawings.

A conventional dual type of tractor master cylinder is illustrated at 1, actuated by the usual pedal 2 and through ducts 3 and 4 actuating some of the tractor brakes, for example, the front wheel brakes 5. Arranged immediately adjacent the tractor master cylinder is an auxiliary actuating cylinder 6. A duct 7 connects the master cylinder 1 with the auxiliary cylinder 6 and ducts 8 and 9 connect to other of the tractor brakes for instance, the rear wheel brakes 10.

The pistons and check valves in the auxiliary cylinders 6 and 11 are actuated simultaneously by the pedal or lever 12 as shown in my co-pending application Ser. No. 533,171 filed Mar. 10, 1966, for "Auxiliary Control for Dual Automotive Brake System," and in co-pending Patent No. 3,302,402 and so these details need no further illustration.

The auxiliary cylinders 6 and 11 may be side by side or one above the other and the pistons therein are driven through the walking beam 13, the pedals 2 and 12 being so close together on the vehicle that the operator may easily operate both simultaneously.

Cylinder 11 differs from cylinder 6 in that a duct 14 leads from a hydraulic fluid reservoir 15 to the cylinder 11 in much the same manner as the duct 7 leads to the cylinder 6. A duct 16 leads from the cylinder 11 just as the duct 8 leads from the cylinder 6 through a coupling 17 to the brake system 18 on the trailer. The details of the trailer brake system being conventional, need no further illustration.

Assuming that the tractor is operated in the absence of the trailer, the duct 16 will be closed at the coupling 17. A driver will under these circumstances normally control the brakes front and rear of the tractor through the master cylinder 1 and since the cylinder 6 at that time will be open for full flow of hydraulic fluid to the rear brakes as well, the operator will handle the braking system just as if there were no auxiliary cylinders.

If the operator desires to do so, he can apply the brakes to the rear wheels only by stepping on the pedal 12, temporarily severing the effective connection between the master cylinder 1 and the rear wheel brakes but applying pressure to the rear wheel brakes through the ducts 8 and 9 by movement of the piston in the cylinder 6. Because there is no escape of hydraulic fluid from the cylinder 11 through the closed off duct 16 the piston therein cannot move but the walking beam connection will permit movement of the piston in the cylinder 6 to apply the rear wheel brakes.

If for some reason, the system connecting to the front wheel brakes loses hydraulic fluid, the operator is still able to apply pressure to the rear wheel brakes through the auxiliary cylinder 6. If the system communicating with the rear wheel brakes should lose hydraulic fluid, the operator is still able to control the front wheel brakes through direct communication with the master cylinder.

If the tractor is operated with a trailer, then the coupling 17 may be opened for free flow of hydraulic fluid from the tractor to the trailer system. If the two systems are, as they may well be, hydraulically interconnected or if they are not hydraulically interconnected, the pressure applied to the coupling 17 from the duct 16 may mechanically apply pressure to the trailer system without the necessity of hydraulic connection between them.

With this arrangement, the operator can apply both front and rear wheel brakes by manipulating the master cylinder to apply pressure to front and rear wheel brakes just as if the cylinder 6 were absent.

If the operator desires to do so, he may apply brake pressure to the trailer by manipulating the pedal 12. This will also apply brake pressure through cylinder 6 to the rear tractor brakes only.

If the operator applies pressure to both pedals 2 and 12, this will result in brake pressure to the front wheels from the master cylinder 1 and brake pressure to the rear tractor wheels and trailer wheels independent of the master cylinder.

I claim:
1. In combination, a first automotive vehicle, a dual master cylinder thereon, separate hydraulic systems associated with the master cylinder, each system adapted to conduct brake pressure from the master cylinder to brake means associated with at least one separate vehicle wheel, a first auxiliary cylinder in series with the master cylinder in one of the hydraulic systems, including means for temporarily interrupting the hydraulic connection through such system between the master cylinder and the brake means associated therewith, and means for supplying pressure through such system independent of the master cylinder to said brake means, characterized by the fact that the first automotive vehicle carries
   a second auxiliary cylinder having a brake fluid supply,
   a hydraulic pressure duct leading therefrom independent of the hydraulic systems associated with the master cylinder, means in said second auxiliary cylinder for supplying hydraulic pressure to said duct, and means for simultaneously actuating the pressure supplying means in both said auxiliary cylinders.

2. The device of claim 1 characterized by the fact that a second trailer automotive vehicle is removably attached to the first vehicle and is equipped with hydraulic brakes, there being a removable connection between the pressure duct leading from the second auxiliary cylinder to the trailer whereby pressure supplied by the second master cylinder only, applies the trailer brakes, there being a single means associated with both auxiliary cylinders for simultaneously actuating the pressure supplying means therein.

3. The device of claim 2 characterized by the fact that the single means causing pressure supply in each auxiliary cylinder are balanced to permit the pressure supply means in the first auxiliary cylinder to operate when hydraulic flow in the duct leading from the second cylinder toward the trailer is prevented.

4. The device of claim 3 characterized by the fact that the single means includes a walking beam, connections between opposite ends of the walking beam and the auxiliary cylinders and a power transmission means pivoted to the walking beam intermediate its ends.

References Cited
UNITED STATES PATENTS

| | | | |
|---|---|---|---|
| 3,064,434 | 11/1962 | Parrett | 188—152 XR |
| 3,302,402 | 2/1967 | Branson | 60—54 |

MILTON BUCHLER, *Primary Examiner.*

J. McLAUGHLIN, *Assistant Examiner.*